G. P. LUEDKE.
THRESHING MACHINE.
APPLICATION FILED JUNE 23, 1916.

1,290,610.

Patented Jan. 7, 1919.
5 SHEETS—SHEET 3.

Witnesses

G. P. Luedke, Inventor,
by C. A. Snow & Co.
Attorneys.

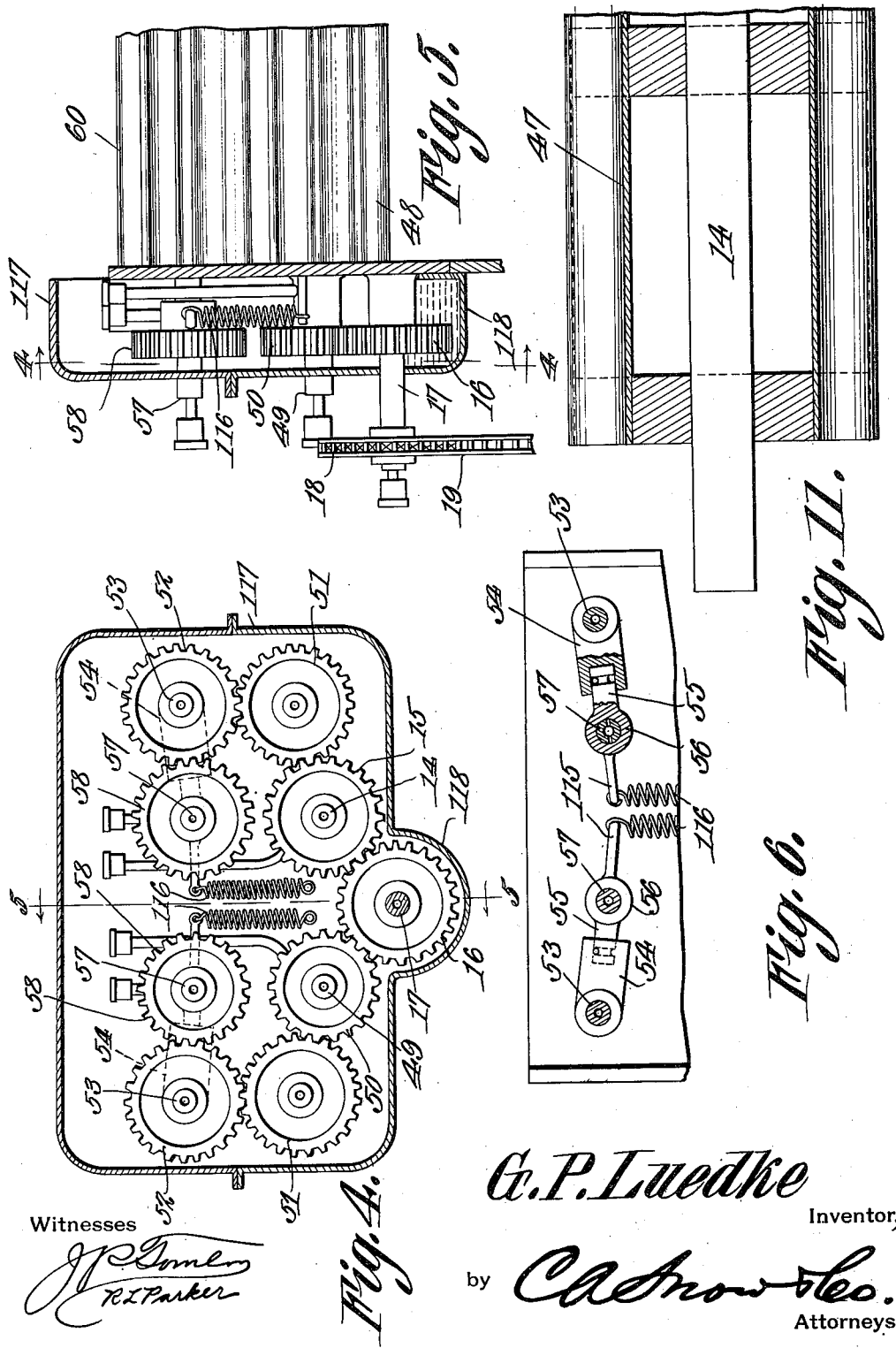

G. P. LUEDKE.
THRESHING MACHINE.
APPLICATION FILED JUNE 23, 1916.
1,290,610.
Patented Jan. 7, 1919.
5 SHEETS—SHEET 5.
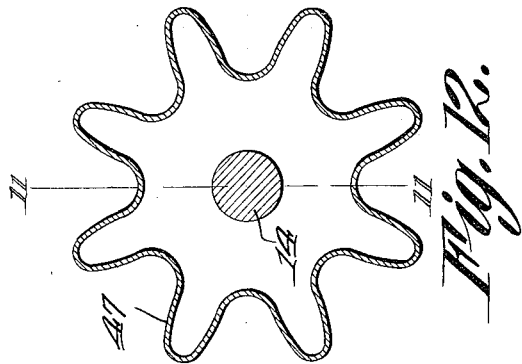
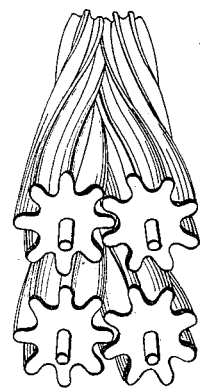
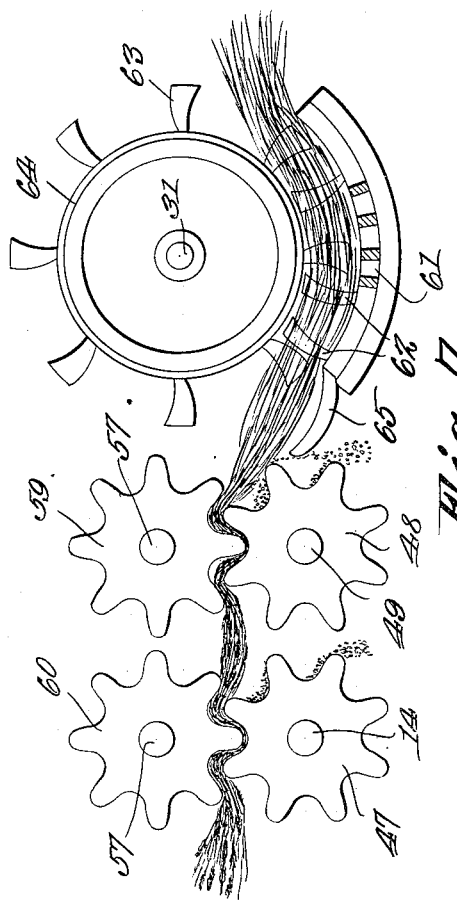
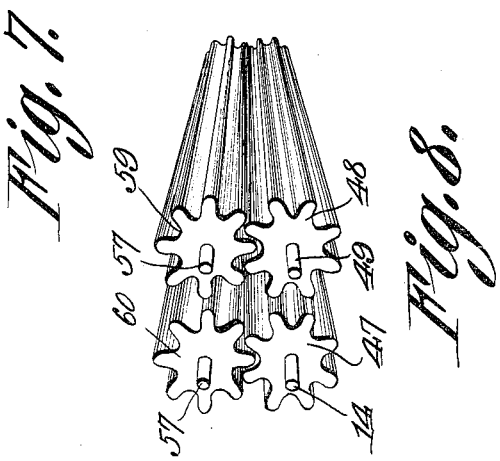
Witnesses
G. P. Luedke
Inventor,
by
Attorneys.

UNITED STATES PATENT OFFICE.

GUSTAV P. LUEDKE, OF SPRINGFIELD, ILLINOIS, ASSIGNOR, BY MESNE ASSIGNMENTS, TO WILLIAM HUGHES DILLER, OF SPRINGFIELD, ILLINOIS.

THRESHING-MACHINE.

1,290,610.           Specification of Letters Patent.      Patented Jan. 7, 1919.

Application filed June 23, 1916. Serial No. 105,490.

*To all whom it may concern:*

Be it known that I, GUSTAV P. LUEDKE, a citizen of the United States, residing at Springfield, in the county of Sangamon and State of Illinois, have invented a new and useful Threshing-Machine, of which the following is a specification.

This invention relates to threshing machines, one of its objects being to provide a light, simple, and compact machine which can be made and sold at low cost and which, while requiring much less power than ordinarily to operate it, presents an extensive rubbing surface to the grain and seed so that the threshing operation is carried on rapidly and efficiently.

A further object is to provide threshing mechanism through which the material will pass continuously without danger of choking, means being provided for pulling and rubbing grain and seed prior to its movement into the concave, this action resulting in the separation of a large percentage of the grain and seed before the concave is reached so that it becomes practically impossible for any of the grain and seed to be lost by passing out of the machine with the straw.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the accompanying drawings the preferred form of the invention has been shown.

In said drawings:—

Fig. 4 is an elevation of the gears used for driving the threshing rolls, the hood being shown in section, on line 4—4 of Fig. 5.

Fig. 5 is a section on line 5—5 Fig. 4.

Fig. 6 is a view partly in elevation and partly in section of the bearings at one side of the machine for the upper rolls.

Fig. 7 is an enlarged view partly in elevation and partly in section of the threshing mechanism.

Fig. 8 is a perspective view of the threshing rolls.

Fig. 9 is a perspective view showing a modified form of threshing roll.

Fig. 10 is a detail view of a portion of the curtain.

Fig. 11 is a longitudinal section through a portion of one of the corrugated rolls.

Fig. 12 is a section through the roll shown in Fig. 11.

Figure 1:
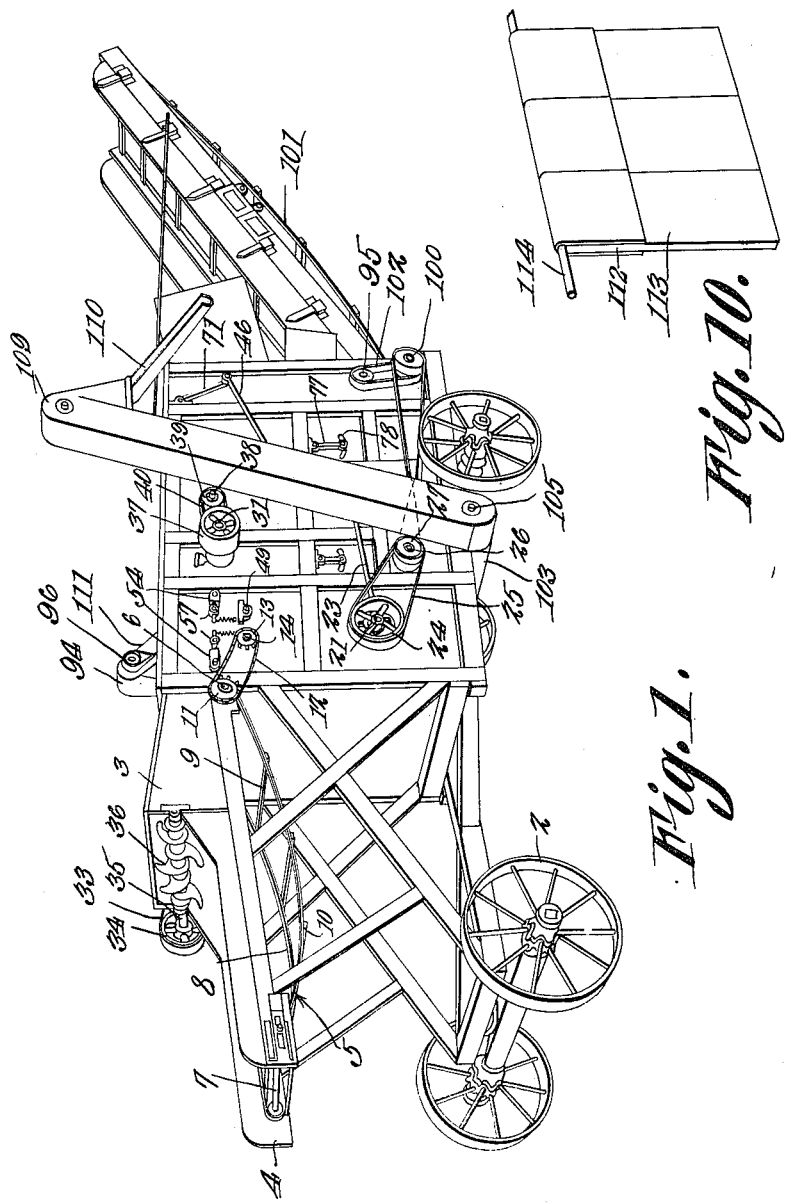
Figure 1 is a perspective view of the machine.
Figure 2:
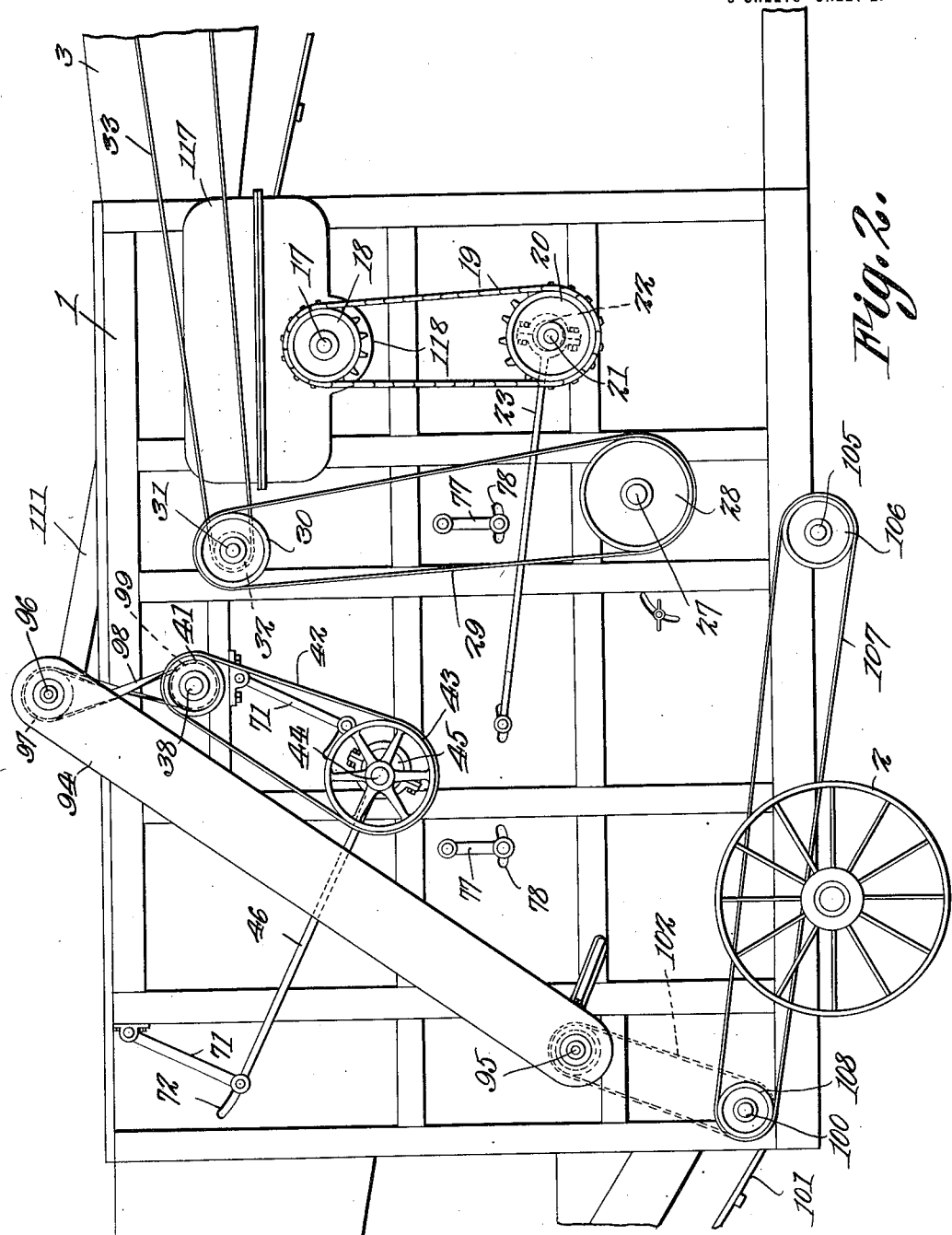
Fig. 2 is an enlarged elevation of the body of the machine, showing the side opposite to that illustrated in Fig. 1.
Figure 3:
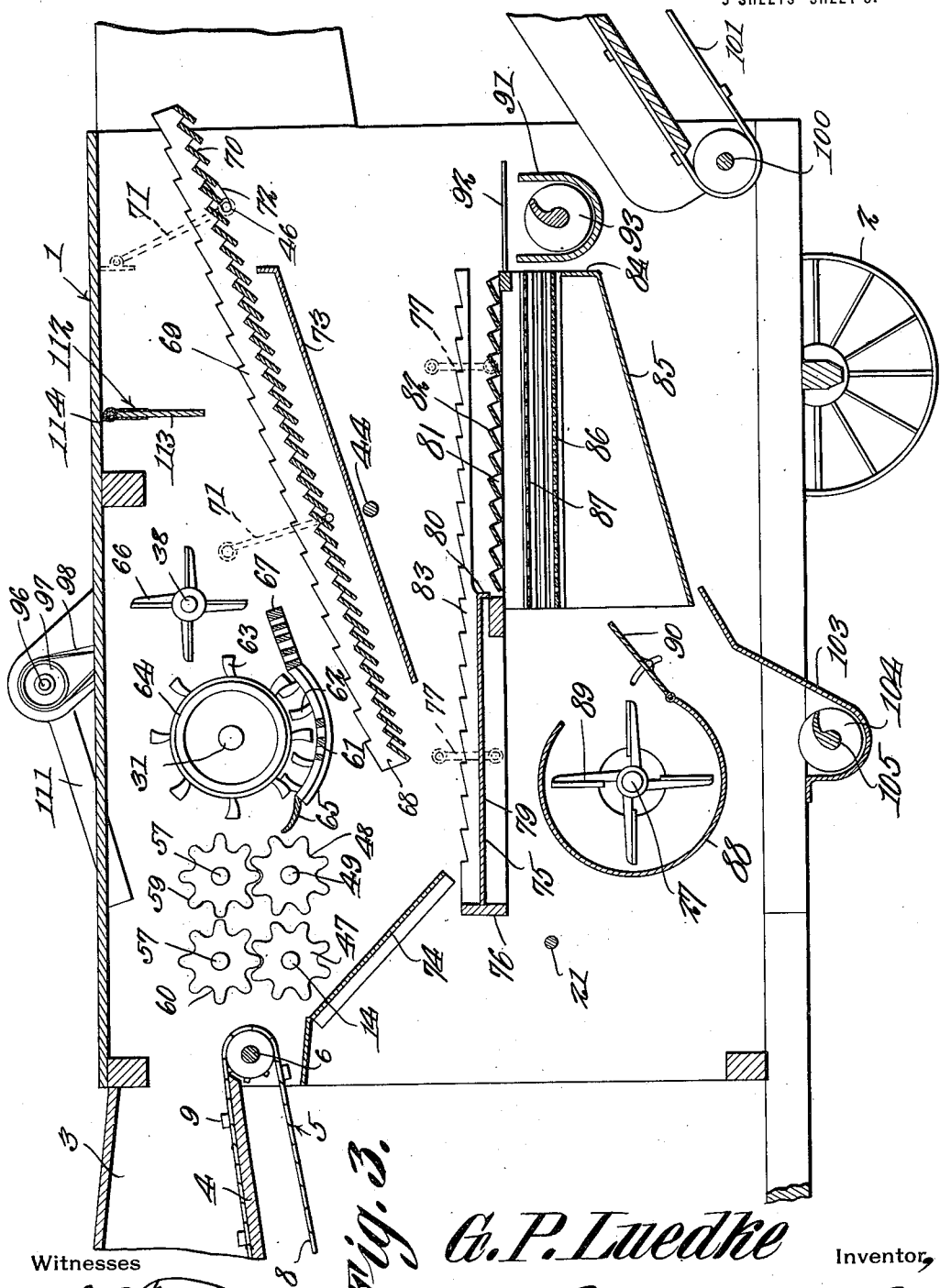
Fig. 3 is a central longitudinal section through that portion of the machine shown in Fig. 2.

Referring to the figures by characters of reference 1 designates the housing of the machine which is open at its ends and is mounted on suitable supporting wheels 2 whereby it can be drawn readily from place to place. A feed hood 3 is arranged adjacent the top of one end of the housing and leading thereto is a feed table 4 provided with an endless conveyer 5 supported by shafts 6 and 7 located adjacent the ends of the table. The conveyer can be of any desired construction, and in the present instance includes endless chains 8 connected by slats or plates 9. A sprocket 11 is secured to one end of the shaft 6 and receives motion through a chain 12 from a sprocket 13 secured to one end of a transverse shaft 14 arranged within the housing 1. To the other end of this shaft is secured a gear 15 which constantly meshes with a gear 16 mounted for rotation on a stud 17. A sprocket 18 rotates with the gear 16 and is adapted to receive motion through a chain 19 from a sprocket 20 which is secured to a transverse shaft 21 provided, near each end, with an eccentric 22. A rod 23 is actuated by each eccentric and is preferably located outside of the housing 1.

Shaft 21 is provided at one end with a pulley 24 which receives motion through a belt 25 from a pulley 26 secured to a transverse shaft 27 and another pulley 28 is secured to the other end portion of this shaft 27 and receives motion, through a belt 29, from a pulley 30 secured to a transverse shaft 31. Another pulley 32 is secured to this shaft 31 and transmits motion through a belt 33 to a pulley 34 secured to one end of a shaft 35 extended across the upper portion of the inlet end of hood 3 and has feeding knives 36 extending therefrom. Shaft 31 constitutes the drive shaft of the machine and is provided at that end thereof remote from the pulley 30, with a pulley 37 designed to receive motion through a belt, not shown, from a suitably arranged motor. Arranged in front of and parallel with the shaft 31 is a transverse shaft 38 having a pulley 39 designed to receive motion, through a belt 40, from the shaft 31 and secured to this shaft 38 near its other end, is a pulley 41 designed to transmit motion, through a belt 42, to a pulley 43 secured to a shaft 44. On this shaft is arranged an eccentric 45, one of these eccentrics being located at each end of the shaft and each eccentric being adapted to actuate a rod 46.

Secured to the shaft 14 is a longitudinally corrugated roller 47 which can be made solid or, if preferred, can be formed of toothed heads to the peripheral portions of which may be fastened a sheet metal sheathing conforming with the contour of the teeth. Arranged in front of and close to but out of contact with the roller 47 is another similar corrugated roller 48 which is secured to a transverse shaft 49 having a gear 50 at one end constantly meshing with the gear 16. Meshing with the respective gears 15 and 50 are intermediate gears 51 which, in turn, mesh with gears 52 arranged thereabove and mounted for rotation on studs 53. Pivotally mounted on each of these studs is a block 54 in which is swiveled a stem 55. The free end of each stem is formed with a bearing 56 in which is journaled one end portion of a shaft 57. The two shafts 57 are parallel and are disposed directly over the respective shafts 14 and 49 and each of these shafts 57 has a gear 58 meshing with the adjacent gear 52. The gear 58 above gear 50 is preferably smaller than the other gear 58 and, consequently, when the various gears are in operation, shaft 57 located above shaft 49 will be rotated at a higher speed than the other shaft 57. The two shafts 57 are provided at both ends with bearings such as shown in Fig. 6 so that it is thus possible for either or both ends of each shaft 57 to move upwardly or downwardly without, however, disconnecting the shaft from its driving mechanism.

Secured to the high speed shaft 57 is a longitudinally corrugated roll 59 located directly above the roll 48, it being understood that the gear 50 is smaller than the gear 15 so that shaft 49 and roll 48 will rotate at a higher speed than the roll 47 and at the same speed as the roll 59. The other shaft 57 has a corrugated roll 60 located directly above roll 47 and adapted to rotate at the same speed as said roll 47. The rolls of each pair are so disposed that the corrugations thereon will work between each other without, however, coming into contact. This is clearly shown in Fig. 7. By thus arranging the parts, grain can be fed between the rolls and will be crimped thereby without causing the kernels of the grain to become crushed.

The corrugated rolls are located close to the discharge end of the feed apron or conveyer 5 so that as the grain is carried from said conveyer it will be directed between the corrugated rolls of the first pair. Arranged close to but behind the roll 48 is a concave 61 the teeth 62 of which are designed to project between the teeth 63 on a threshing cylinder 64 which is secured to and rotates with the shaft 31. A guide apron 65 serves to direct grain and straw from the corrugated rolls 48 and 59 to the concave 61. The concave and the threshing cylinder can be of any desired construction, although it is preferred to use a cylinder of the nine bar type and a concave of the two bar type.

Secured to the shaft 38 which is close to and behind the threshing cylinder is a beater 66 including a series of radial blades extending longitudinally of the shaft.

Extending from the discharge end of the concave is a grate 67 consisting of parallel straps preferably of metal and spaced apart to permit grain to fall therebetween.

Suspended within the housing 1 with its lower or inner end below the concave 61 is a straw rack 68 which is inclined upwardly away from the concave. This rack is made up of parallel ribs 69 of the type known as "fish-back" ribs and connecting these ribs at their lower edges are parallel inclined cross slats 70 designed to direct grain downwardly and inwardly. The straw rack is supported by hangers 71 and the rods 46 hereinbefore referred to are attached to the upper hangers 71. All of the hangers are designed to work within arcuate slots 72 in the sides of the housing 1.

Fixedly mounted below the straw rack is a return board 73 and another return board 74 is fixedly mounted below the corrugated rolls, these two return boards converging downwardly and being adapted to discharge the grain onto a chaffer 75. This chaffer includes a frame 76 suspended by hangers 77 which are adapted to receive motion from the rods 23, said hangers working within arcuate slots 78. That portion of the frame of the chaffer extending under the lower ends of the return boards 73 and 74 is formed with an imperforate bottom 79 terminating at its discharge end in a depending lip 80. A riddle 81 is arranged within the frame 76 beyond the lip 80 and is formed of sheet metal with upstruck lips 82 inclined downwardly and inwardly. Toothed bars 83 are secured upon the bottom 79 and extend longitudinally of the frame 76, those portions of the bars above the riddle being spaced therefrom so as to permit free circulation of air transversely above the riddle and under the bars.

Arranged under the riddle 81 is a shoe 84 the bottom of which constitutes a return board as shown at 85 and located above this return board are superposed screens 86 and 87, the upper screen 87 having larger openings therein than the lower screen 86. A blower casing 88 is arranged back of the shoe 84 and is concentric with shaft 27, the blower 89 being secured to this shaft and there being a gate or valve 90 for regulating the flow of air from the casing 88 to the screens.

Arranged at the discharge end of the chaffer is a transverse trough 91 and fingers 92 extend from the end of the chaffer and overhang the trough. In this trough is arranged a worm conveyer 93 one end of which extends into the lower end of an elevator casing 94. The shaft 95 of this worm conveyer is designed to be driven by the elevator, which can be of any desired construction, the shaft 96 at the upper end of said elevator receiving motion through a pulley 97 from a belt 98 which, in turn, is driven by a pulley 99 on the shaft 38.

A transverse shaft 100 is arranged below and adjacent the trough 91 and serves to drive a straw elevator 101 which can be of any desired construction and which extends throughout the width of the lower portion of the housing 1 at the discharge end thereof. This shaft receives motion through a belt 102 from shaft 95.

Arranged at the discharge end of the return board 85, and under the blower casing 88, is a trough 103 in which is arranged a worm conveyer 104 the shaft 105 of which has a pulley 106 which receives motion through a belt 107 from a pulley 108 on shaft 100. This worm conveyer is designed to discharge grain into the lower end of an elevator casing 109, the elevator being operated by shaft 105 and being of any desired construction. Both of the elevator casings 94 and 109 have discharge spouts 110 and 111 respectively. The spout 110 extends laterally and constitutes an outlet for the threshed grain, while the spout 111 constitutes means for returning to the corrugated rolls, the tailings delivered from the chaffer 75. Thus any material which may pass through the machine without being properly threshed will be returned to the machine and again be acted on by the threshing mechanism.

For the purpose of preventing grain from being thrown out of the machine by the rapidly rotating threshing cylinder, a curtain 112 is suspended transversely within the housing 1 above the straw rack 68 and between beater 66 and the discharge end of the housing. This curtain, as shown particularly in Fig. 10, is made up of a series of flaps 113 hung from a cross rod 114 and adapted to swing relative thereto.

For the purpose of holding the upper corrugated rolls 59 and 60 drawn yieldingly toward the lower rolls 47 and 48, the bearings 56 are provided with fingers 115 to which are secured springs 116, these springs extending downward from the fingers and being attached at their lower ends to the sides of the housing 1. Thus under normal conditions the upper rolls are drawn downwardly to their lower limit but, as has heretofore been pointed out, when the upper rolls are in their normal or lowermost positions, they do not contact with the lower rolls but are spaced therefrom a distance approximately equal to the diameter of a kernel of grain. Consequently the grain, in passing between the rolls will not be crushed although the straw will be crimped.

The gears used for operating the corrugated rolls are preferably arranged within a housing 117 and the lower portion of this housing in which the gear 16 is located, can be used as an oil cup or receptacle, as shown at 118 so that the gearing will thus be kept thoroughly lubricated.

In operation the grain is supplied to the feeder and will be directed thereby into hood 3, the rotating knives or fingers 36 coöperating with the endless conveyer 8 to force the grain to the first pair of corrugated rolls 47 and 60. As the straw passes between these rolls it will be crimped thereby and a large amount of the grain will be separated therefrom and fall onto the return board 74. As the straw issues from between the rolls 47 and 60 it will become engaged by the rolls 48 and 59 which rotate at a higher speed than the rolls 47 and 60 and thus serve to pull upon the straw, thereby stripping the grain and thoroughly rubbing it so that by the time the straw has left the rolls 48 and 59, practically a large portion of the grain has been separated therefrom and has been directed onto the return board 74. After leaving the rolls 48 and 59 the straw passes onto the concave 61 where it is acted upon by the rapidly rotating threshing cylinder 64. Here the threshing operation is practically completed, the straw and chaff being thrown onto the straw rack 68. The rotating beater 66 will prevent the straw from wrapping around the threshing cylinder, and the curtain 112 will prevent the same from being thrown out of the machine. As the rack 68 is reciprocated, the grain and chaff mingled with the straw will drop onto the return board 73 and will fall onto the pan 79. As the chaffer 75 reciprocates continuously, the material discharged onto the pan will be directed longitudinally of the chaffer and will meet a blast of air ascending from the casing 88 and which blast will direct the chaff and straw outwardly from the chaffer while the grain will fall onto the screens 87 and 86 and will be directed by the return board 85 to the trough 103. The grain will be elevated from this trough and discharged through the laterally extending spout 110 while the tailings delivered into the trough 91 will be returned to the rolls 59 and 60 by way of spout 111. Here the tailings will fall onto the straw in the space between the two pairs of rolls and as the straw at this point has been torn and thinned by the pulling action of the rolls 59 and 48, fine particles will fall through the straw while the larger particles will be carried with the straw between the rolls 59 and 48 and again be subjected to the threshing action of the machine.

Should the material be supplied too rapidly to the corrugated rolls, said upper rolls will be free to raise at either or both ends so that choking of the apparatus will be prevented. By providing bearings 56 such as shown in Fig. 6, this tilting action of the rolls will not result in the shafts thereof binding in the bearings. Instead the stems 55 will rotate and the blocks 45 will swing under the action of the rolls.

Importance is attached to the threshing action which takes place between the corrugated rolls. It has been found in practice that by providing rolls which are combined in the manner described and which operate as set forth, the grain is subjected to the maximum rubbing action and much less power is required to drive the mechanism than is the case where the threshing cylinder is depended upon for performing the entire threshing operation. As the second set of rolls rotate at a higher speed than the rolls of the first pair, the first pair of rolls will hold the straw while the rolls of the second pair are rubbing and pulling on the straw and, as the threshing cylinder rotates at a much higher speed than the second pair of rolls, the straw will be held back by the rolls while it is being acted on by the threshing cylinder. This combined rubbing and beating process which is set up results in a thorough and rapid separation and leaves the straw in good condition. Furthermore the grain will not become crushed and, as has been heretofore pointed out, it has been found in actual practice that a large portion of the threshing will take place before the straw enters the concave.

Although the threshing rolls employed are preferably corrugated longitudinally, it is to be understood that if desired, the corrugations may be extended spirally as indicated for example in Fig. 9. Also instead of forming the rolls of heads and sheet metal faces, as hereinbefore described, said rolls can be made in any other way desired. For example, they can be cast solid or they can be made of solid wooden cores sheathed with metal.

What is claimed is:—

1. In a threshing machine, the combination with non-contacting threshing rolls having interfitting corrugations constituting straw crimping means, of a second pair of non-contacting rolls having interfitting corrugations and revoluble at a higher speed than the other rolls thereby to tear and thin out the straw located between the pairs of rolls and to rub the grain and separate it from the straw, separating means for receiving material discharged from the rolls, and means for elevating the tailings from the separating means and directing them downwardly onto the thinned straw in the space between the pairs of rolls.

2. In a threshing machine the combination with spaced pairs of non-contacting, corrugated threshing rolls, the corrugations of the rolls of each pair interfitting to constitute crimping means, of means for driving the rolls of one pair faster than the rolls of the other pair to tear and thin out the straw in the space between the rolls and to rub and separate grain from the straw, a threshing cylinder spaced from and rotating faster than the high speed rolls for tearing the straw from said rolls and completing the threshing operation, separating means for receiving material from the rolls and cylinder, and means for elevating tailings from the separating means and depositing them upon the thinned straw in the space between the rolls.

In testimony that I claim the foregoing as my own, I have hereto affixed my signature in the presence of two witnesses.

GUSTAV P. LUEDKE.

Witnesses:
E. A. RINCK,
WM. HUGHES DILLER.